United States Patent
Wagg

[19]

[11] Patent Number: 5,823,304
[45] Date of Patent: Oct. 20, 1998

[54] METHOD FOR PRODUCING A BRAKE DRUM

[75] Inventor: Theodore J. Wagg, New Hudson, Mich.

[73] Assignee: Kelsey-Hayes Company, Livonia, Mich.

[21] Appl. No.: 725,135

[22] Filed: Oct. 2, 1996

Related U.S. Application Data

[60] Provisional application No. 60/004,781 Oct. 4, 1995.
[51] Int. Cl.⁶ .................................................. F16D 65/10
[52] U.S. Cl. .......................... 188/218 R; 29/901; 82/903
[58] Field of Search ......................... 188/218 R; 29/901; 82/1.11, 903, 112

[56] References Cited

U.S. PATENT DOCUMENTS

| | | | |
|---|---|---|---|
| 2,288,438 | 6/1942 | Dach | 188/218 R |
| 2,847,088 | 8/1958 | Two | 188/218 R |
| 3,506,478 | 4/1970 | Hudson et al. | |
| 4,986,149 | 1/1991 | Carmel et al. | 82/1.11 |
| 5,138,757 | 8/1992 | Ball et al. | 29/407 |

FOREIGN PATENT DOCUMENTS 56-52633   5/1981   Japan ................................. 188/218 R

OTHER PUBLICATIONS

"Brake Squeal—The Influence of Rotor Geometry, An overview of a presentation to the 10th Annual SAE Braking Colloquium", by Allan M. Lang, Mintex Don Ltd. England, Oct. 13, 1992.

*Primary Examiner*—Peter M. Poon
*Attorney, Agent, or Firm*—MacMillan, Sobanski & Todd, LLC

[57] ABSTRACT

An improved method for producing a final balanced and noise suppressing brake drum including a generally closed outer end, a generally axially extending cylindrical main body, and an open inner end. The closed outer end of the brake drum includes a centrally located wheel spindle opening formed therein, and a plurality of lug bolt mounting holes spaced circumferentially around the wheel spindle opening. The cylindrical main body of the brake drum is formed during a casting operation and includes a plurality of discrete raised segments formed on an outer surface thereof. Preferably, at least three raised segments are provided on an outer surface of the brake drum, and at least two of the three segments are spaced apart from one another by generally equal angles. The discrete raised segments are provided at predetermined locations on the outer surface to reduce brake noise and are selectively machined during a machining operation to produce a final balanced brake drum.

26 Claims, 3 Drawing Sheets

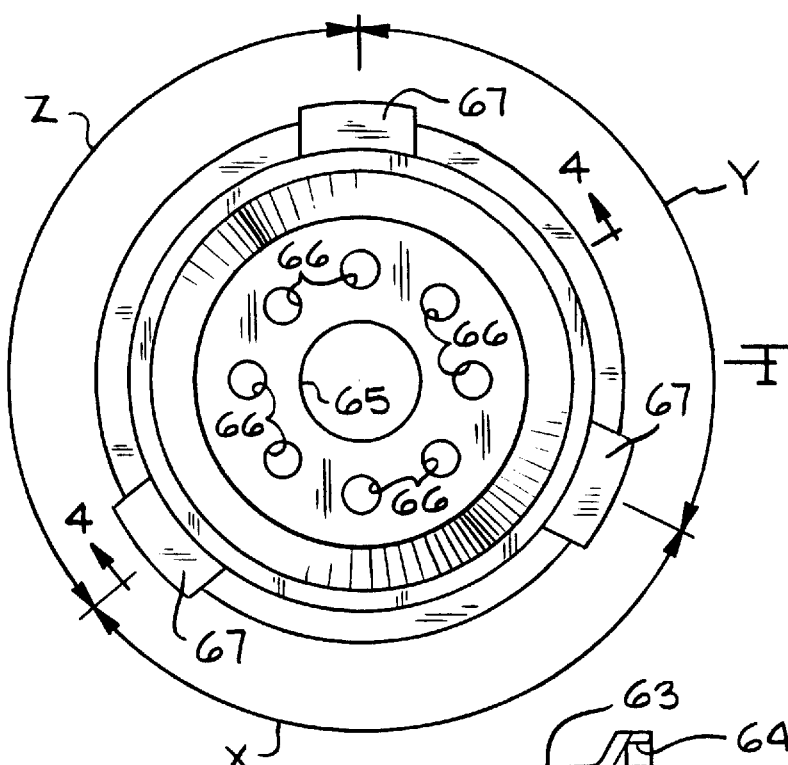
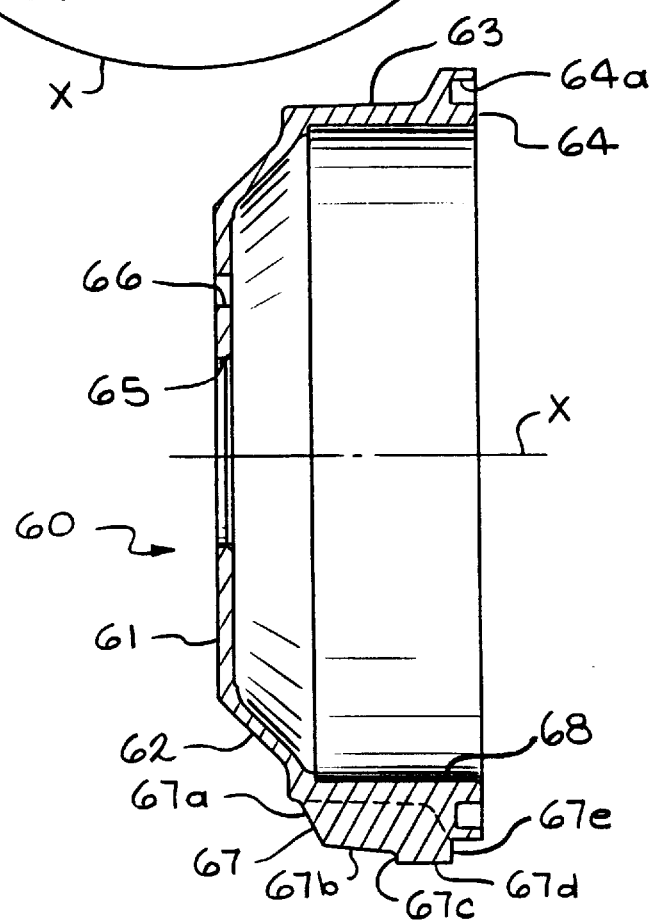

METHOD FOR PRODUCING A BRAKE DRUM

CROSS-REFERENCE TO RELATED APPLICATIONS

This application claims the benefit of U.S. Provisional Application No. 60/004,781, filed Oct. 4, 1995.

STATEMENT AS TO RIGHTS TO INVENTIONS MADE UNDER FEDERALLY SPONSORED RESEARCH AND DEVELOPMENT

Not Applicable

BACKGROUND OF THE INVENTION

This invention relates in general to vehicle drum brake assemblies and in particular to an improved method for producing a brake drum for use in such a vehicle drum brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies can be actuated by hydraulic, pneumatic, or mechanical pressure generated by an operator of the vehicle depressing a foot pedal, pulling a hand lever, and the like. The structure and operation of both drum brake assemblies and disc brake assemblies, as well as the actuators therefor, are well known in the art.

A typical drum brake assembly includes a backing plate which is secured to a fixed, non-rotatable component of the vehicle, such as the vehicle axle housing. A pair of opposed arcuate brake shoes are supported on the backing plate for selective movement relative thereto. Each of the brake shoes has a friction pad or lining secured thereto. The brake drum assembly further includes a cylindrical brake drum which is secured to the vehicle wheel for rotation therewith. The interior of the brake drum is hollow, defining an inner cylindrical braking surface. The brake drum is disposed adjacent to the backing plate such that the brake shoes extend within the cylindrical braking surface. To effect braking action, the brake shoes are moved outwardly apart from one another such that the friction pads frictionally engage the cylindrical braking surface of the brake drum. Such frictional engagement causes slowing or stopping of the rotational movement of the brake drum and, therefore, the wheel of the vehicle in a controlled manner.

One or more actuating mechanisms are provided in the brake drum assembly for selectively moving the brake shoes outwardly apart from one another into frictional engagement with the cylindrical braking surface of the brake drum. Usually, a hydraulically or pneumatically actuated service brake mechanism is provided for selectively actuating the drum brake assembly under normal operating conditions. Such a service brake mechanism can include a hydraulic cylinder having a pair of opposed pistons which abut and move the brake shoes apart from one another into frictional engagement with the cylindrical braking surface of the brake drum.

A mechanically actuated parking and emergency brake mechanism is also usually provided for selectively actuating the drum brake assembly. The parking and service brake mechanism can include an actuating lever pivotally supported on one of the brake shoes. The actuating lever is connected to a cable which, when pulled, moves the brake shoes apart from one another into frictional engagement with the cylindrical braking surface of the brake drum.

Typically, the brake drum is cast from gray iron during a conventional sand-patterned casting operation. After cleaning, the "as cast" brake drum is precision drilled and concentrically machined to predetermined tolerances. However, at this point, the brake drum typically incorporates a sufficient imbalance which renders the brake drum unsatisfactory for use on a vehicle. There are several known methods for correcting the imbalance of a brake drum.

U.S. Pat. No. 3,506,478 to Hudson et al. discloses two methods for correcting the imbalance of a brake drum. According to this patent, one or more balance weights can be attached to outer surface of the brake drum by welding, or molten metal can be sprayed on outer surface of the brake drum to correct the imbalance.

U.S. Pat. No. 4,986,149 to Carmel et al. discloses another method for correcting the imbalance of a heavy duty brake drum having an integral raised squealer band. According to the method of this patent, a crescent or wedge of material is preferably cut away from an outer surface of the squealer band by a lathe during an eccentric turning process to produce a final balanced brake drum.

As discussed above, the inner cylindrical surface of the brake drum is frictionally engaged by the brake shoes during braking. As a result of this, brake noise, commonly referred to as brake "squeal", is produced during braking. While the above discussed balancing methods are effective to correct the imbalance in the brake drum, these methods are not effective to suppress the brake squeal noise which is generated during frictional engagement of the brake drum by the brake shoes.

It is known to add a plurality of discrete masses on an outer surface of a brake drum or brake rotor to reduce or eliminate brake squeal noise generated during braking. However, while the added masses are effective to reduce or eliminate brake squeal noise, the added masses are not effective to correct the imbalance in the associated brake component. Thus, it would be desirable to be provide an improved method for producing a brake drum which reduces brake squeal noise and corrects the imbalance of the brake drum in a relatively easy and inexpensive manner.

SUMMARY OF THE INVENTION

This invention relates to an improved method for producing a final balanced and noise suppressing brake drum. The brake drum includes a generally closed outer end, a generally axially extending cylindrical main body, and an open inner end. The closed outer end of the brake drum includes a centrally located wheel spindle opening formed therein, and a plurality of lug bolt mounting holes spaced circumferentially around the wheel spindle opening. The cylindrical main body of the brake drum is formed during a casting operation and includes a plurality of discrete raised segments formed on an outer surface thereof. Preferably, at least three raised segments are provided on an outer surface of the brake drum, and at least two of the three segments are spaced apart from one another by generally equal angles. The discrete raised segments are provided at predetermined locations on the outer surface of the brake drum to reduce brake noise and are selectively machined during a machining operation to thereby produce a final balanced brake drum.

Various objects and advantages of this invention will become apparent to those skilled in the art from the follow-

BRIEF DESCRIPTION OF THE DRAWINGS

FIG. 3 is a top view of the brake drum illustrated in FIG. 1.

FIG. 4 is a sectional view of the brake drum taken along line 4—4 of FIG. 3.

DETAILED DESCRIPTION OF THE PREFERRED EMBODIMENT

Figure 1:
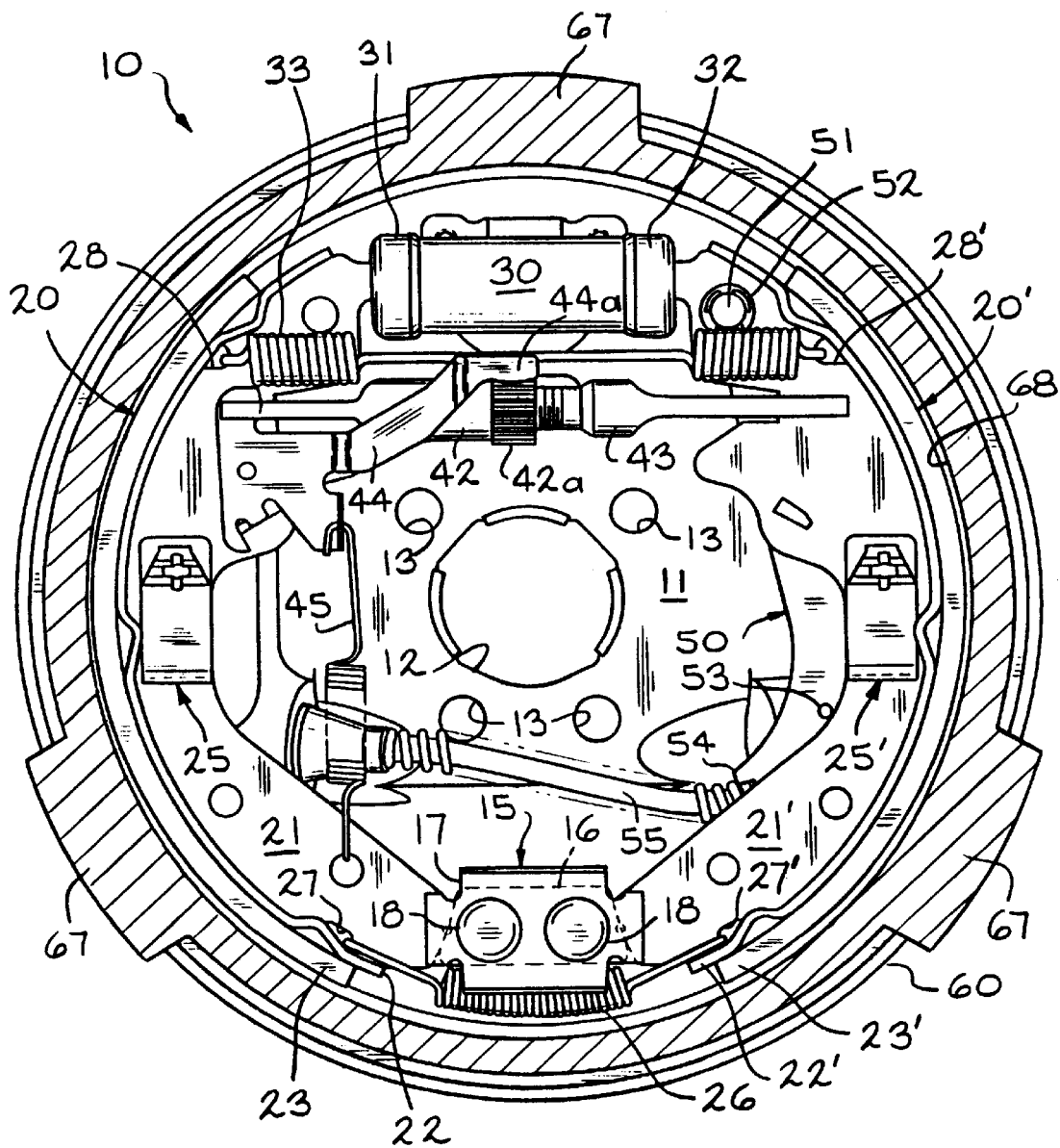
FIG. 1 is a side elevational view of a portion of a drum brake assembly including an improved brake drum in accordance with this invention.

Referring now to the drawings, there is illustrated in FIG. 1 a portion of a drum brake assembly, indicated generally at 10. The illustrated drum brake assembly 10 is associated with a left rear wheel (not shown) of a vehicle. The general structure and operation of the drum brake assembly 10 is conventional in the art. Thus, only those portions of the drum brake assembly 10 which are necessary for a full understanding of this invention will be explained and illustrated in detail. Although this invention will be described and illustrated in connection with the particular vehicle drum brake assembly disclosed herein, it will be appreciated that this invention may be used in connection with other drum and disc brake assemblies.

The illustrated drum brake assembly 10 includes a rigid backing plate 11 which is generally flat and circular in shape. The backing plate 11 is adapted to be secured to a fixed, non-rotatable component of the vehicle, such as an outer end of an axle housing (not shown) for enclosing a rotatable axle. To accomplish this, a relatively large opening 12 is formed through the central portion of the backing plate 11. The central opening 12 is provided to permit the outer end of the rotatable axle to extend therethrough to the driven vehicle wheel (not shown). A plurality of relatively small holes 13 are also formed through the backing plate 12, located about the central opening 12. The small holes 13 are provided to permit threaded bolts (not shown) to extend therethrough to secure the backing plate 12 to the outer end of the axle housing.

An abutment block assembly, indicated generally at 15, is provided on the outer surface of the backing plate 11. The abutment block assembly 15 includes an inner spacer plate 16, which is disposed adjacent to the outer surface of the backing plate 11, and an outer retainer plate 17, which is disposed adjacent to the spacer plate 16. The spacer plate 16 and the retainer plate 17 are secured to the backing plate 11 by a pair of rivets 18 or similar fasteners which extend therethrough to the inner surface of the backing plate 11.

The drum brake assembly 10 includes first and second brake shoes, indicated generally at 20 and 20'. Structurally, the brake shoes 20 and 20' are essentially mirror images of one another, and like reference numbers are used to indicate similar parts. The brake shoes 20 and 20' include respective web portions 21 and 21' which are generally flat and crescent-shaped. Arcuate table portions 22 and 22' are secured to the opposed outer curved surfaces of the web portions 21 and 21', such as by welding. A friction pad 23 is secured to the outer arcuate surface of the table portion 22 of the brake pad 20, while a friction pad 23' is secured to the outer arcuate surface of the table portion 22' of the brake pad 20'. A circular aperture 24 is formed through the upper end of the web portion 21 of the brake shoe 20, and a circular aperture (not shown) is formed through the upper end of the web portion 21' of the brake shoe 20' for a purpose which will be explained below.

The first and second brake shoes 20 and 20' are supported on the backing plate 11 by respective pivot pin and spring-clip assemblies, indicated generally at 25 and 25', which are conventional in the art. As shown by the dotted lines in FIG. 1, the lower ends of the web portions 21 and 21' of the brake shoes 20 and 20' are slightly curved. The curved lower ends of the web portions 21 and 21' are received between the backing plate 11 and the retainer plate 17 and extend into abutment with the opposed side surfaces of the spacer plate 16. A first coiled spring 26 has hooked ends which extend through respective openings 27 and 27' formed through the lower ends of the web portions 21 and 21' so as to urge such lower ends thereof into abutment with the opposed side surfaces of the spacer plate 16.

The drum brake assembly 10 further includes a service brake mechanism for actuating the drum brake assembly 10 under normal operating conditions. The service brake mechanism includes a hydraulic actuator 30 which is secured to the backing plate 11 between the upper ends of the web portions 21 and 21' of the brake shoes 20 and 20', respectively. The hydraulic actuator 30 includes a pair of opposed pistons 31 and 32 which respectively abut the upper ends of the web portions 21 and 21'. A second coiled spring 33 has hooked ends which extend through respective openings 28 and 28' formed through the upper ends of the web portions 21 and 21' so as to urge such upper ends thereof into abutment with the pistons 31 and 32. The hydraulic actuator 30 is connected to a conventional source of pressurized hydraulic or pneumatic fluid (not shown) for operating the drum brake assembly 10.

The brake drum assembly 10 further includes a hollow cylindrical brake drum 60 which is secured to a wheel (not shown) of the vehicle for rotation therewith. The interior of the brake drum 60 defines a cylindrical braking surface 68. When installed, the brake drum 60 is disposed adjacent to the backing plate 11 such that the brake shoes 20 and 20' extend within the cylindrical braking surface 68. To effect braking action, the brake shoes 20 and 20' are moved outwardly apart from one another so as to frictionally engage the cylindrical braking surface 68 of the brake drum 60. Such frictional engagement causes slowing or stopping of the rotational movement of the brake drum 60 and, therefore, the wheel of the vehicle in a controlled manner.

The hydraulic actuator 30 is used to operate the brake drum assembly 10 under normal service conditions. When it is desired to actuate the drum brake assembly 10, pressurized hydraulic or pneumatic fluid is supplied to the hydraulic actuator 30. Typically, this is accomplished by the operator of the vehicle depressing the brake pedal in the driver compartment of the vehicle. When such pressurized hydraulic or pneumatic fluid is supplied to the hydraulic actuator 30, the pistons 31 and 32 are moved apart from one another. As a result, the upper ends of the brake shoes 20 and 20' are also moved apart from one another, essentially pivoting about the abutment block assembly 15. This movement causes the friction pads 23 and 23' to move into frictional engagement with the cylindrical braking surface 68 of the brake drum 60. The abutment block assembly 15 functions to transfer the braking torque from the leading brake shoe (i.e., the left brake shoe 20 when the brake drum 60 is rotating in a counter-clockwise direction) to the frame of the vehicle. When the brake shoes 20 and 20' are moved apart from one another, the second coiled spring 33 is expanded. Thus, when the pressurized hydraulic or pneumatic fluid to the hydraulic actuator 30 is subsequently released, the second coiled spring 33 retracts the brake shoes 20 and 20' inwardly toward one another and out of frictional engagement with the cylindrical braking surface 68 of the brake drum 60.

The drum brake assembly 10 also includes an automatic adjusting mechanism to compensate for thinning of the friction pads 23 and 23' resulting from wear caused by repeated use. The illustrated automatic adjusting mechanism is conventional in the art and includes a pair of mutually threaded struts 42 and 43 having opposed slotted ends. The upper ends of the web portions 21 and 21' of the brake shoes 20 and 20', respectively, are received within the slotted ends of the struts 42 and 43. A star wheel portion 42a is formed integrally on the strut 42. An adjuster lever 44 is pivotally mounted on the web portion 21 of the brake shoe 20. The adjuster lever 44 has a protruding arm portion 44a which extends into cooperation with the star wheel portion 42a of the strut 42. A third coiled spring 45 has hooked ends which extend through respective openings formed through the adjuster lever 44 and the lower end of the web portion 21 so as to urge the protruding arm portion 44a of the adjuster lever 44 into engagement with the star wheel portion 42a of the strut 42.

As is known, when the brake shoes 20 and 20' are moved outwardly apart from one another such that the friction pads 23 and 23', respectively, frictionally engage the cylindrical braking surface 68 of the brake drum 60, the adjusting lever 44 is pivoted. When a sufficient amount of wear has occurred on the friction pads 23 and 23', the adjusting lever 44 will be pivoted a sufficient amount so as to rotate the star wheel portion 42a and the strut 42 relative to the strut 43. Such relative rotation causes the opposed ends of the struts 42 and 43 to be moved slightly farther apart from one another, together with the associated upper ends of the brake shoes 20 and 20'. Thus, the automatic adjusting mechanism functions to maintain a predetermined clearance between the friction pads 23 and 23' of the brake shoes 20 and 20', respectively, and the cylindrical braking surface 68 of the brake drum 60 as wear occurs during operation of the drum brake assembly 10.

In addition to the service brake mechanism described above, the drum brake assembly 10 further includes a mechanically actuated parking and emergency brake mechanism. The parking and emergency brake mechanism includes an actuating lever, indicated generally at 50. The actuating lever 50 is pivotally supported on the web 21' of brake shoe 20' by a pivot pin assembly which includes a pivot pin 51 having an enlarged head and a reduced diameter body. The body of the pivot pin 51 is inserted through respective aligned apertures formed through the actuating lever 50 and the web portion 21' of the brake shoe 20'. An E-clip 52 is installed in a groove formed about the end of the body of the pivot pin 51 to retain it in the apertures such that the actuating lever 50 is pivotally supported on the brake shoe 20'. The actuating lever 50 further includes an upstanding pin 53, and a hooked lower end portion 54. The hooked end portion 54 facilitates the connection of one end of an actuating cable 55 thereto. The actuating cable 55 is conventional in the art and is connected to a hand operated lever (not shown) or similar manually operable parking and emergency brake mechanism for selectively actuating the drum brake assembly 10. The construction of the drum brake assembly 10 thus far described is conventional in the art.

Figure 2:
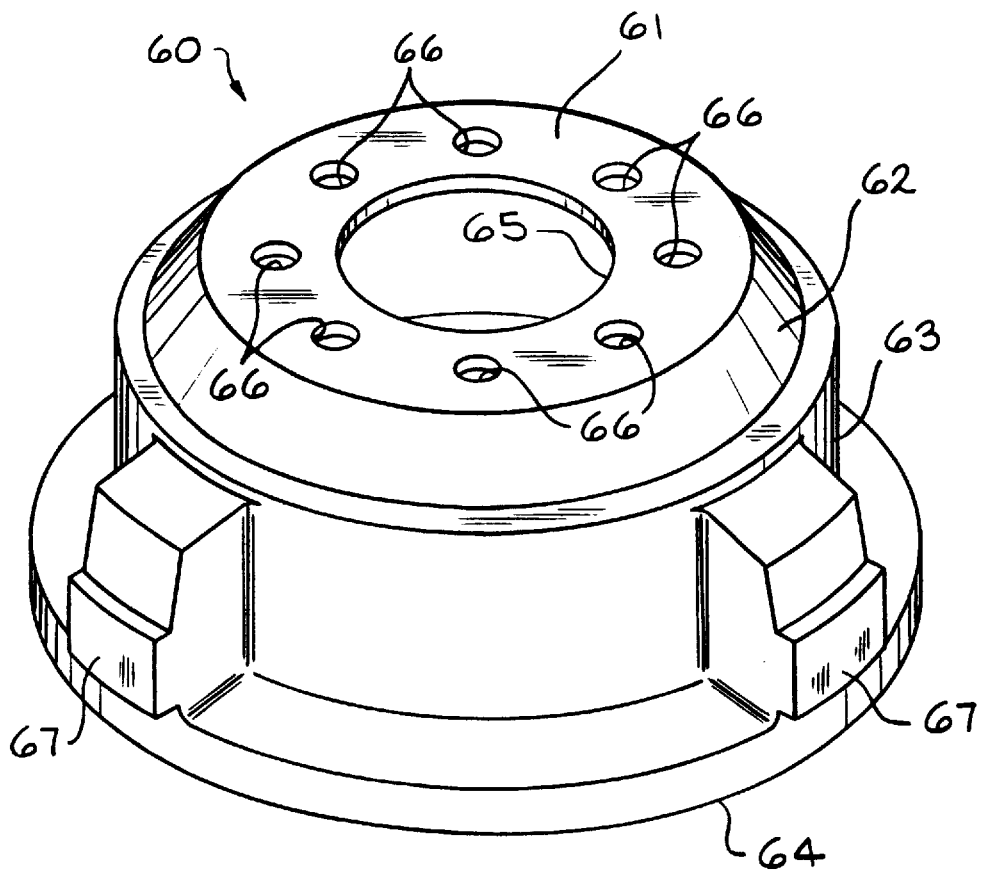
FIG. 2 is a perspective view of the brake drum illustrated in FIG. 1.

Turning now to FIGS. 2 through 4, the structure of the improved brake drum 60 of this invention will be discussed. The brake drum 60 defines a drum axis X, and includes a generally closed outer end 61, a transition section 62, a generally axially extending cylindrical main body 63, and an open inner end 64. The illustrated brake drum 60 is a "full cast" brake drum and may be cast from gray iron during a sand pattern casting operation.

The closed end 61 of the brake drum 60 defines a drum mounting flange and includes a centrally located wheel spindle opening 65. A plurality of lug bolt mounting holes 66 (eight lug bolt mounting holes 66 being illustrated) are spaced circumferentially around the wheel spindle opening 65. Preferably, the wheel spindle opening 65 is formed during the casting operation, and the lug bolt mounting holes 66 are subsequently formed during a drilling operation. The lug bolt mounting holes 66 are adapted to receive lug bolts (not shown) for securing a wheel (not shown) to the brake drum 60 for rotation therewith. The open end 64 of the brake drum 60 has an annular groove 64a formed therein. The annular groove 64a is adapted to receive an outer annular flange portion (not shown) of the backing plate 11 to form a "labyrinth" seal and prevent water, dirt, mud, and other debris from passing into the interior of the brake drum assembly 10 when installed on the vehicle. Preferably, the annular groove 64a is formed during the finish machining operation.

The cylindrical body 63 of the brake drum 60 has at least one, and preferably a plurality, of discrete raised segments 67 formed thereon. The raised segments 67 are preferably formed of the same material as the cylindrical body 63 of the brake drum 60 and are integrally formed on the outer surface of the cylindrical body 63 during the casting of the brake drum 60. In the illustrated embodiment, the brake drum 60 includes three raised segments 67 which are identical to one another in size and mass. The raised segments 67 are spaced apart from one another by predetermined angles X, Y, and Z. In the illustrated embodiment, the angles X and Y are approximately 115°, and the angle Z is approximately 130°.

Each of the raised segments 67 includes a generally radially extending first surface 67a, a generally axially extending second surface 67b, a generally radially extending third surface 67c, a generally axially extending fourth surface 67d, and a generally radially extending fifth surface 67e. As will be discussed, the particular configuration of the illustrated segments 67 is effective to locate a substantial portion of their mass adjacent the open end 64a of the brake drum 64.

During the finish machining operation of the brake drum 60, material is removed from one or more of the raised segments 67 to produce the final balanced and noise suppressing brake drum 60. In particular, during the finish machining operation, material is preferably removed from the fourth surface 67d and the fifth surface 67e of the raised segments 67.

Although the structure of the brake drum 60 of this invention has been described and illustrated as having three raised segments 67 which are of the same size, the structure can be other than illustrated. The particular number, shape, and angular spacing of each of the raised segments 67 depends upon the particular vehicle application. However, the particular angular spacing between the raised segments 67 is selected mainly for noise suppression. Also, the more mass of each of the associated segments 67 which is located adjacent the open end 64 of the brake drum 60, the better the noise suppression.

Also, while this invention has been described and illustrated in connection with a full cast gray iron brake drum 60, it will be appreciated that the brake drum 60 of this invention may be used in connection with other brake drums. For example, the brake drum can be constructed from other metals. Also, the brake drum can be a "composite" brake drum (not shown), a "heavy duty" brake drum having an integrally raised squealer band (not shown), or an "integral hub" brake drum (not shown). In addition, although the invention has been described and illustrated in connection with a leading/trailing type of drum brake assembly 10, it will be appreciated that this invention may be used in connection with other of drum and disc brake assemblies. For example, this invention may be used in a "duo-servo" type of drum brake assembly (not shown), in a "dual mode" drum brake assembly (not shown), wherein the service brake is of the leading/trailing type and the parking and emergency brake is of the duo-servo type, or in a "drum-in-hat" disc brake assembly (not shown), wherein the service brake is a disc brake and the parking and emergency brake is a drum brake.

In accordance with the provisions of the patents statues, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A brake drum adapted for use in a drum brake assembly comprising:

a hollow cylindrical brake drum defining a brake drum axis and including a generally closed outer end, a generally radially extending transition section, a generally axially extending cylindrical main body, and an opened inner end;

a plurality of discrete raised segments provided on an outer surface of said cylindrical main body, each of said raised segments having a generally stepped configuration including a generally radially extending first surface, a generally axially extending second surface, a generally radially extending third surface, a generally axially extending fourth surface, and a generally radially extending fifth surface, said raised segments extending substantially the entire axial length of said outer surface of said cylindrical main body; and at least a portion of one of said first surface, said second surface, said third surface, said fourth surface, and said fifth surface on at least one of said raised segments being selectively machined to thereby produce the brake drum.

2. The brake drum defined in claim 1 wherein said brake drum is a full cast brake drum.

3. The brake drum defined in claim 1 wherein said raised segments are located adjacent said opened inner end.

4. The brake drum defined in claim 1 wherein said brake drum includes a centrally located wheel spindle opening in said opened end, and a plurality of lug bolt mounting holes spaced circumferentially around said wheel spindle opening.

5. The brake drum defined in claim 1 wherein said brake drum includes annular groove formed in said opened end.

6. The brake drum defined in claim 1 wherein at least a portion of one of said fourth surface and said fifth surface on at least one of said raised segments is selectively machined.

7. The brake drum defined in claim 1 wherein at least a portion of both of said fourth surface and said fifth surface on at least one of said raised segments is selectively machined.

8. The brake drum defined in claim 1 wherein at least two of said three discrete raised segments are spaced from each other by generally equal angles.

9. The brake drum defined in claim 1 wherein the brake drum is a composite brake drum.

10. A method for producing a brake drum adapted for use in a disc brake assembly comprising the steps of:

(a) providing a brake drum defining a brake drum axis and including a generally closed outer end, a generally radially extending transition section, a generally axially extending cylindrical main body, and an opened inner end, the cylindrical main body of the brake drum including a plurality of discrete raised segments formed on an outer surface thereof, each of the raised segments having a generally stepped configuration including a generally radially extending first surface, a generally axially extending second surface, a generally radially extending third surface, a generally axially extending fourth surface, and a generally radially extending fifth surface, the raised segments extending substantially the entire axial length of the outer surface of the cylindrical main body; and (b) selectively machining at least a portion of one of the first surface, the second surface, the third surface, the fourth surface, and the fifth surface on at least one of the raised segments to thereby produce the brake drum.

11. The method defined in claim 10 wherein the cylindrical body of the brake drum and the plurality of discrete raised segments are formed from the same material.

12. The method defined in claim 11 wherein the cylindrical body of the brake drum and the plurality of discrete raised segments are integrally formed during a casting operation.

13. The method defined in claim 10 wherein the plurality of discrete raised segments are generally identical to one another in size and mass.

14. The method defined in claim 10 wherein the plurality of discrete raised segments are located adjacent the open end of the brake drum.

15. The method defined in claim 10 wherein the brake drum includes three discrete raised segments.

16. The method defined in claim 15 wherein at least two of the three discrete raised segments are spaced apart from each other by generally equal angles.

17. The method defined in claim 16 wherein the equal angles is approximately 115°.

18. The method defined in claim 10 and further including the step of forming a centrally located wheel spindle opening in the open end of the brake drum and a plurality of lug bolt mounting holes spaced circumferentially around the wheel spindle opening.

19. The method defined in claim 10 and further including the step of forming an annular groove in the open end of the brake drum.

20. The method defined in claim 10 wherein the brake drum is a full cast brake drum.

21. The method defined in claim 10 wherein the cylindrical main body includes an integral raised squealer band, the squealer band including a plurality of discrete raised segments formed on an outer surface thereof.

22. The method defined in claim 10 wherein the brake drum is a composite brake drum.

23. The method defined in claim 10 wherein the brake drum is an integral hub brake drum.

24. The method defined in claim 23 wherein step (b) includes selectively machining at least a portion on both of the fourth surface and the fifth surface on at least one of the raised segments.

25. The method defined in claim 10 wherein step (b) includes selectively machining at least a portion of one of the fourth surface and the fifth surface on at least one of the raised segments.

26. The method defined in claim 10 wherein the brake drum is an integral hub brake drum.

* * * * *